United States Patent [19]

Vachey

[11] Patent Number: 4,467,856
[45] Date of Patent: Aug. 28, 1984

[54] PROCESS FOR OBTAINING A SILVER PRODUCT WHICH IS BLACK-COLORED IN ITS WHOLE MASS AND SILVER PRODUCTS THUS OBTAINED

[76] Inventor: Lucien Vachey, 45, avenue des Ternes, Paris 75017, France

[21] Appl. No.: 439,983

[22] Filed: Nov. 8, 1982

[30] Foreign Application Priority Data

Nov. 19, 1981 [FR] France ................................ 81 21701

[51] Int. Cl.³ .............................................. B22D 25/00
[52] U.S. Cl. ......................................... 164/47; 164/80
[58] Field of Search ................. 164/47, 80; 423/561 R

[56] References Cited

U.S. PATENT DOCUMENTS 2,963,530 12/1960 Hanks ..................................... 164/80
3,411,566 11/1968 Astrou .................................... 164/80

Primary Examiner—Kuang Y. Lin
Assistant Examiner—Richard K. Seidel
Attorney, Agent, or Firm—Cushman, Darby & Cushman

[57] ABSTRACT

According to the invention, a silver product which is black-colored in its whole mass is obtained by pouring molten silver into molten sulfur or by heating silver pieces in the presence of sulfur pieces or still by subjecting silver sheets or silver threads to sulfur vapors until complete oxidation of the silver, by converting in powder the oxidized silver and by heating the powder thus obtained preferably in the presence of a flux. The product thus obtained may be used for the manufacture of jewels which comprise at least a portion made of black silver colored in its mass.

10 Claims, No Drawings

PROCESS FOR OBTAINING A SILVER PRODUCT WHICH IS BLACK-COLORED IN ITS WHOLE MASS AND SILVER PRODUCTS THUS OBTAINED

The present invention relates to a process enabling a silver product which is black-coloured in its mass to be obtained, and the product thus obtained as well.

BRIEF DESCRIPTION OF THE PRIOR ART

It is already known to blacken a silver mass on the surface area thereof, on purpose to impart to said sikver and old-fashion appearance. Thus, it is possible to dip an article made of silver into an alkaline hypochloride/water solution, resulting in a blackening of the whole surface area of said silver mass, whereupon the product thus obtained is rubbed at selected locations on purpose to immediately eliminate the superficial layer of black silver.

Such a process enables to obtain a certain appearance, but does not allow to obtain a silver block which would be coloured in its mass. Particularly, a silver block which is treated in this manner and then melted would no longer keep, after cooling, the appearance of a black silver block. Thus, it is not possible to use this process for making articles, for instance jewels, which can keep permanently their black colour.

OBJECT OF THE INVENTION

The object of the present invention is to provide a process which enables to obtain a silver block which is black-coloured in its mass, and which may be melted on purpose to be shaped as desired, while keeping its black colour, not only at its surface area, but also within its whole mass.

Accordingly, the invention relates to a process for the preparation of a silver product, black-coloured in its whole mass, comprising the step of closely contacting silver with sulfur or with a compound containing sulfur or able to generate sulfur until complete oxidation of the silver, said process further comprising the steps of reducing into powder the black silver thus obtained, melting said powder, casting the molten silver into a mould and cooling the moulded product thus obtained until complete solidification thereof.

DETAILED DESCRIPTION OF THE INVENTION

According to a first alternative embodiment of the process of the invention, molten silver is poured into a molten sulfur bath, then heated until complete elimination of the sulfur. The product thus obtained is melted in turn either merely by heating or by using a convenient flux such as borax.

According to another alternative embodiment of the invention, silver pieces are either introduced into a molten sulfur bath or placed on sulfur, whereupon the assembly is heated until complete elimination of the sulfur and the solid product thus obtained is melted either by merely heating it or by using a melting agent.

According to a preferred alternative embodiment of the invention, the blackening of the silver is obtained by gaseous diffusion. The silver is previously converted into sheets having a slight thickness, for instance 1/10 mm, or shaped into a thin thread, and is contacted with sulfurous vapours for instance by suspending silver above a molten sulfur bath or by connecting a closed chamber containing the silver to a chamber containing molten sulfur until the sheet or the thread may be properly disintegrated by finger contact.

Hence, it should be noted that it may be possible to subject silver to sulfurous vapours at atmospheric pressure or at a pressure different from the atmospheric one, thus enabling a quicker result to be obtained.

The powder thus obtained is melted by preferably using a flux such as borax. Within the scope of the present invention, it would appear that a particularly interesting result would be obtained by using potassium carbonate as a flux. The silver thus melted may be directly used in a casting process on the purpose to produce articles or may be moulded as ingots in view of a further use after melting again. On purpose to obtain an ingot of better grade, said ingot or the moulded article should preferably be melted or cast at a pressure lower than the atmospheric one, on purpose to avoid a superficial combustion of the metalloid.

By way of a particular example of embodiment, silver sheets having a thickness of 1/10 mm have been crimped and located on a grid within a closed chamber comprising a safety valve and containing burning sulfur blocks. After five hours of sulfur burning, the chamber was opened and the black silver powder thus obtained was ground by means of a pounding device on purpose to render said powder uniform. Then, the powder has been put into a melting-pot located within a chamber subjected to a vacuum of 0.8 bar, and heated to the melting point thereof. The liquid metal was then poured into a mould maintained at the same vacuum pressure and kept at the room temperature until complete cooling. The article thus obtained was black in its whole mass.

For obtaining an article which would be more resistent, a small amount of white silver powder may be introduced in the mixture before the melting process. By way of example, black silver powder has been mixed to white silver powder (18% by weight) having an average size of the particles of 1/100 mm.

It was also possible to add a slight amount of a metal which would impart a colour to black silver. Thus, by way of example, an amount of copper powder (3% by weight) was added to the black silver powder or to the black silver mixture, as stated hereinabove, said copper particles having an average size of 1-100 mm.

The ingot thus obtained is wholly black-coloured in its mass, and besides have the usual properties of a silver ingot, as regards the moulding ability thereof.

The present invention is not limited to the aforesaid examples of embodiments. On the contrary, it encompasses the modifications and alternative embodiments obvious to those skilled in the art.

What I claim is:

1. A process for the preparation of a silver product, black-coloured in its whole mass, comprising the step of closely contacting silver with sulfur or with a compound containing sulfur or able to generate sulfur until complete oxidation of the silver, said process further comprising the steps of:
    reducing into powder the black silver thus obtained;
    melting said powder;
    casting the molten silver into a mould; and
    cooling the moulded product thus obtained until complete solidification thereof.

2. The process according to claim 1, wherein the melting procedure of the powdered black silver is carried out in the presence of a flux.

3. The process according to claim 2, wherein said flux is borax.

4. The process according to claim 1, wherein the melting procedure of the black silver is carried out at a pressure lower than the atmospheric pressure.

5. The process according to claim 4, wherein the casting procedure is carried out at a pressure lower than the atmospheric pressure.

6. The process according to claim 1, wherein a slight amount of white silver powder is mixed to the black silver powder previously to the melting of the blend.

7. The process according to claim 1, wherein a slight amount of different powdered metal is added before the melting procedure.

8. The process according to claim 7, characterized in that the powdered metal is copper.

9. The process according to claim 6, wherein a slight amount of coloring powdered metal is added before the melting procedure.

10. A silver product as produced by the process of claim 1 which is black-coloured in its whole mass.

* * * * *